(12) United States Patent
Ebner et al.

(10) Patent No.: US 10,807,642 B2
(45) Date of Patent: Oct. 20, 2020

(54) CONTROL UNIT AND METHOD FOR PROVIDING A CORRECTION MOVE FOR A REVERSE PARKING ASSISTANCE SYSTEM

(71) Applicant: Bayerische Motoren Werke Aktiengesellschaft, Munich (DE)

(72) Inventors: Adrian Ebner, Munich (DE); Michael Stroebel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/504,404

(22) Filed: Jul. 8, 2019

(65) Prior Publication Data

US 2019/0329822 A1 Oct. 31, 2019

Related U.S. Application Data

(63) Continuation of application No. PCT/EP2017/081539, filed on Dec. 5, 2017.

(30) Foreign Application Priority Data

Jan. 9, 2017 (DE) .................. 10 2017 200 216

(51) Int. Cl.
*B62D 15/00* (2006.01)
*B62D 15/02* (2006.01)
(Continued)

(52) U.S. Cl.
CPC ......... *B62D 15/0285* (2013.01); *B60W 30/09* (2013.01); *B60W 30/18036* (2013.01)

(58) Field of Classification Search
CPC .............. B62D 15/0285; B60W 30/09; B60W 30/10836
See application file for complete search history.

(56) References Cited

U.S. PATENT DOCUMENTS 7,734,415 B2 * 6/2010 Oumi ................. G01C 21/3641
701/417
8,803,707 B2 * 8/2014 Takano ..................... B60R 1/00
340/932.2
(Continued)

FOREIGN PATENT DOCUMENTS

| CN | 105197010 A | 12/2015 |
| DE | 10 2010 030 208 A1 | 12/2011 |
| DE | 10 2013 213 225 A1 | 1/2015 |

OTHER PUBLICATIONS

International Search Report (PCT/ISA/210) issued in PCT Application No. PCT/EP2017/081539 dated Mar. 2, 2018 with English translation (four (4) pages).

(Continued)

*Primary Examiner* — Ojiako K Nwugo
(74) *Attorney, Agent, or Firm* — Crowell & Moring LLP

(57) ABSTRACT

A control unit for a reverse parking assistance system of a vehicle is configured to determine a reverse travel trajectory for a reverse travel from an end position to a start position based on reference data relating to a first forward travel of the vehicle. Furthermore, the control unit is configured to control a steering device of the vehicle during the reverse travel of the vehicle as a function of the reverse travel trajectory. In addition, the control unit is configured to detect that the vehicle leaves the reverse travel trajectory on the reverse travel. Furthermore, the control unit is configured to bring about, as a reaction thereto, that in a second forward travel, the vehicle is guided to a reverse travel position, which makes it possible to guide the vehicle again along at least one section of the reverse travel trajectory to the start position.

12 Claims, 2 Drawing Sheets

(51) Int. Cl.
*B60W 30/09* (2012.01)
*B60W 30/18* (2012.01)

(56) References Cited

U.S. PATENT DOCUMENTS

| | | | | |
|---|---|---|---|---|
| 2008/0195285 | A1* | 8/2008 | Shimizu | B60R 1/00 701/45 |
| 2010/0039249 | A1* | 2/2010 | Schmitz | B60K 28/066 340/439 |
| 2010/0049402 | A1* | 2/2010 | Tanaka | B60R 1/00 701/41 |
| 2011/0087406 | A1* | 4/2011 | Barth | B60Q 1/48 701/41 |
| 2011/0140920 | A1* | 6/2011 | Schwartz | B60R 1/00 340/932.2 |
| 2015/0100177 | A1* | 4/2015 | Inagaki | B62D 15/0285 701/1 |
| 2015/0278611 | A1* | 10/2015 | Chi | G06K 9/00798 348/148 |
| 2016/0297456 | A1* | 10/2016 | Nameki | B61L 3/004 |
| 2018/0137780 | A1* | 5/2018 | Toliver | G09B 19/167 |

OTHER PUBLICATIONS

German-language Written Opinion (PCT/ISA/237) issued in PCT Application No. PCT/EP2017/081539 dated Mar. 2, 2018 (seven (7) pages).
German Search Report issued in counterpart German Application No. 10 2017 200 216.6 dated Sep. 20, 2017 with partial English translation (11 pages).

* cited by examiner

CONTROL UNIT AND METHOD FOR PROVIDING A CORRECTION MOVE FOR A REVERSE PARKING ASSISTANCE SYSTEM

CROSS REFERENCE TO RELATED APPLICATIONS

This application is a continuation of PCT International Application No. PCT/EP2017/081539, filed Dec. 5, 2017, which claims priority under 35 U.S.C. § 119 from German Patent Application No. 10 2017 200 216.6, filed Jan. 9, 2017, the entire disclosures of which are herein expressly incorporated by reference.

BACKGROUND AND SUMMARY OF THE INVENTION

The invention relates to a method and a corresponding control unit for a reversing assistance system of a multitrack motor vehicle.

A vehicle, in particular a road motor vehicle, can comprise one or more driver assistance systems, DASs, in which automatic transverse guidance of the vehicle is effected. By way of example, what is known as a reversing assistance system allows the vehicle to store a trajectory on which the vehicle has driven to a particular position (e.g. into a particular parking space) in the forward direction. The reversing assistance system can then assist a driver in driving away from the particular position again in the reverse direction along the stored trajectory (e.g. driving out of the parking space). The steering interventions in this case are effected autonomously by the vehicle, while the driver of the vehicle typically controls the longitudinal movement of the vehicle.

Depending on the trajectory stored for the travel in the forward direction, the assisted reverse travel can be performed only at a relatively low speed of travel if need be. If the driver of the vehicle drives too quickly during the reverse travel, the vehicle deviates from the prescribed trajectory and the reversing assistance system is typically terminated. As a result, the reversing assistance system is no longer available for the further reverse travel.

The present document is concerned with the technical object of increasing the availability of a reversing assistance system.

According to one aspect, a control unit for a reversing assistance system of a vehicle, in particular a multitrack road motor vehicle, is described. The control unit can be configured to determine reference data in regard to a first forward travel of the vehicle, wherein the reference data indicate a reference trajectory of the vehicle for the first forward travel from an initial position to an end position. The reference data can be stored in a memory unit of the vehicle. The memory unit can be configured to store reference data for a reference trajectory over a particular rated distance (e.g. of 50 meters).

The reference data can comprise e.g. position information in regard to a multiplicity of positions on the reference trajectory. The position information for a position can indicate e.g. coordinates of the position. In addition, the reference data can comprise orientation information with regard to an orientation of the vehicle at a multiplicity of positions. Alternatively or additionally, the reference data can comprise curvature information in regard to the curvature of a multiplicity of segments of the reference trajectory. Therefore, the reference data can be used to indicate the reference trajectory from the initial position to the end position in a precise manner.

The control unit is further configured to take the reference data as a basis for determining a reversing trajectory for a reverse travel from the end position to the initial position. A steering apparatus of the vehicle can then be controlled, within the scope of the reversing assistance system, on the basis of the reversing trajectory during the reverse travel of the vehicle. In particular, the steering apparatus of the vehicle can be actuated in an automatic manner during a reverse travel such that the vehicle is returned from the end position to the initial position along the reversing trajectory. The speed of travel of the vehicle can be controlled by the driver of the vehicle during the reverse travel. In other words, during the reverse travel the longitudinal guidance of the vehicle can be effected at least at times manually or independently by the driver of the vehicle (e.g. by operating an accelerator pedal of the vehicle).

Additionally, the control unit is configured to detect or determine that the vehicle leaves the reversing trajectory on the reverse travel (assisted by the reversing assistance system). This can be caused e.g. by the driver of the vehicle employing an excessively high speed of travel. During the reverse travel, it is possible to repeatedly, in particular periodically (e.g. every second), check whether the vehicle leaves the reversing trajectory on the reverse travel.

In particular, the control unit can be configured to determine a distance of a present or predicted position of the vehicle from the reversing trajectory. By way of example, it is possible to predict that the vehicle will be at a particular distance from the reversing trajectory if the speed of travel at a particular time in advance (e.g. 1 second) is maintained. It is then possible to take the distance as a basis for detecting or determining that the vehicle leaves the reversing trajectory on the reverse travel (e.g. if the distance is equal to or greater than a predefined distance threshold value).

The control unit is further configured to react to it being detected or determined that the vehicle leaves the reversing trajectory by prompting the vehicle to be driven, in a second forward travel, to a reversing position that allows the vehicle to be driven along at least one section (in particular along a remaining section) of the reversing trajectory again to the initial position. In this case, the reversing position can be on the reversing trajectory, which means that the vehicle (assisted by the reversing assistance system) can be driven along the reversing trajectory from the reversing position to the initial position.

Therefore, the driver of a vehicle can continue to be assisted in the reverse travel by a reversing assistance system even if he strays from the reversing trajectory. As such, the availability of a reversing assistance system can be increased.

The control unit can be configured to determine a forward trajectory on which the vehicle can be driven to the reversing position in the second forward travel. In this case, the present orientation of the vehicle and/or the present position of the vehicle can be taken into consideration. The reversing position can in this case preferably be on the reversing trajectory. In addition, the forward trajectory can be determined such that the vehicle, on reaching the reversing position, has an orientation that allows the vehicle to be driven directly along the reversing trajectory from the reversing position to the initial position. The control unit can further be configured to control the steering apparatus of the vehicle on the basis of the forward trajectory during the second forward travel of the vehicle. As such, it is possible in a convenient and reliable manner to allow a forward move that drives the vehicle back onto the reversing trajectory.

The control unit can be configured to output advice to the driver of the vehicle if it has been detected that the vehicle leaves the reversing trajectory on the reverse travel. The advice can indicate that the driver needs to bring the vehicle to a standstill (i.e. needs to reduce the speed of travel of the vehicle to zero) and that the driver needs to select a forward gear for the second forward travel. As such, it is possible to prompt the vehicle to be driven to the reversing position.

The control unit can further be configured to detect that the vehicle reaches (e.g. has reached or will reach) the reversing position. In reaction thereto, the driver of the vehicle can be prompted to bring the vehicle to a standstill and to select a reverse gear in order to continue the reverse travel along the remaining section of the reversing trajectory.

According to a further aspect, a method for driving a vehicle within the scope of a reversing assistance system having automated transverse guidance is described. The method comprises determining, on the basis of reference data in regard to a first forward travel of the vehicle, a reversing trajectory for a reverse travel from an end position to an initial position. It is then possible for the reversing trajectory to be taken as a basis for effecting automated transverse guidance of the vehicle during the reverse travel. Additionally, the method comprises detecting that the vehicle leaves (e.g. has left or will leave) the reversing trajectory on the reverse travel. The method further comprises reacting thereto by prompting the vehicle to be driven, in a second forward travel, to a reversing position that allows the vehicle to be driven along at least one (remaining) section of the reversing trajectory again to the initial position.

The aspects described above have been described in connection with a reversing assistance system. However, it should be pointed out that the described aspects can be applied in a corresponding manner to driver assistance systems that comprise automated transverse and/or longitudinal guidance of a vehicle. In particular, the aspects described are applicable to driver assistance systems for maneuvering a vehicle. In this case, in particular in the claims, the term "reversing assistance system" can be replaced by the term "driver assistance system", the term "first forward travel" can be replaced by the term "reference travel", the term "reverse travel" can be replaced by the term "renewed travel", the term "second forward travel" can be replaced by the term "correction travel", the term "forward trajectory" can be replaced by the term "correction trajectory", the term "reversing position" can be replaced by the term "correction position" and/or the term "reversing trajectory" can be replaced by the term "travel trajectory".

Therefore, a control unit for a driver assistance system of a vehicle having automated transverse guidance and/or automated longitudinal guidance is described. The control unit is configured to take reference data in regard to a reference travel of the vehicle as a basis for determining a travel trajectory for a renewed travel. The reference travel can correspond e.g. to a forward travel or a reverse travel. The renewed travel can in this case correspond to a travel in the same direction as or in the opposite direction to the reference travel. In the case of the renewed travel, the longitudinal guidance of the vehicle can be effected at least at times manually or independently by the driver of the vehicle (e.g. by operating the accelerator pedal of the vehicle).

Additionally, the control unit is configured to detect that the vehicle leaves the travel trajectory on the renewed travel. This can be caused e.g. by the driver driving the vehicle at an excessive speed of travel. The control unit is further configured to react thereto by prompting the vehicle to be driven, in a correction travel, to a correction position that allows the vehicle to be driven along at least one section of the travel trajectory again. The correction travel can in this case be effected in a direction that is in the opposite direction to the renewed travel. The correction travel can therefore return the vehicle to the travel trajectory again in order to continue the renewed travel along the travel trajectory. In this case, the correction position can be on the travel trajectory.

Therefore, the driver of a vehicle can continue to be assisted in the renewed travel by a driver assistance system even if he strays from the travel trajectory. As such, the availability of a driver assistance system can be increased. In particular, a steering apparatus of the vehicle can be automatically controlled on the basis of the travel trajectory and/or on the basis of a correction trajectory (for the correction travel) in this case.

The control unit can be configured to determine a correction trajectory on which the vehicle can be driven to the correction position in the correction travel. In this case, the present orientation of the vehicle and/or the present position of the vehicle can be taken into consideration. The correction position can in this case preferably be on the travel trajectory. In addition, the correction trajectory can be determined such that the vehicle, on reaching the correction position, has an orientation that allows the vehicle to be driven directly from the correction position along the travel trajectory. The control unit can further be configured to control the steering apparatus of the vehicle on the basis of the correction trajectory during the correction travel of the vehicle. As such, it is possible in a convenient and reliable manner to allow a correction move that drives the vehicle back onto the correction trajectory.

The control unit can be configured to output advice to the driver of the vehicle if it has been detected that the vehicle leaves the travel trajectory on a renewed travel. The advice can indicate that the driver needs to bring the vehicle to a standstill (i.e. needs to reduce the speed of travel of the vehicle to zero) and that the driver needs to select a gear change for the correction travel (in order to change the direction of travel of the vehicle). As such, it is possible to prompt the vehicle to be driven to the correction position.

According to a further aspect, a method of driving a vehicle within the scope of a driver assistance system having automated transverse guidance and/or automated longitudinal guidance is described. The method comprises determining, on the basis of reference data in regard to a reference travel of the vehicle, a travel trajectory for a renewed travel. Additionally, the method comprises detecting that the vehicle leaves the travel trajectory on the renewed travel. The method further comprises reacting thereto by prompting the vehicle to be driven, in a correction travel, to a correction position that allows the vehicle to be driven along at least one section of the travel trajectory again.

The reference travel can preferably be a forward travel (in the forward direction of the vehicle). Alternatively, the reference travel can be a reverse travel (in the reverse direction of the vehicle). The renewed travel can be a travel in the direction of the end position or a travel in the direction of the initial position. In addition, the renewed travel can be a forward travel or a reverse travel. Preferably, the renewed travel is a reverse travel in the direction of the initial position. The correction travel can be a travel in the opposite direction from the renewed travel.

In a further preferred example, the reference travel and the renewed travel can each be forward travel or alternatively each be reverse travel. As such, a vehicle can be provided with a reference trajectory for a renewed travel in the same direction of travel.

The control unit can be configured so as, during the renewed travel, to take the travel trajectory as a basis for performing automated transverse guidance and automated longitudinal guidance. If need be, the control unit can receive a control signal from a remote control of the vehicle and then prompt the longitudinal guidance of the vehicle. As such, a user of the vehicle can control the longitudinal guidance of the vehicle by means of a remote control.

According to a further aspect, a multitrack vehicle (in particular a road motor vehicle, e.g. an automobile or a truck or a bus) is described that comprises a control unit described in this document.

According to a further aspect, a software (SW) program is described. The SW program can be configured to be executed on a processor (e.g. on a controller of a vehicle) and to thereby perform one of the methods described in this document.

According to a further aspect, a storage medium is described. The storage medium can comprise an SW program configured to be executed on a processor and to thereby perform one of the methods described in this document.

It should be borne in mind that the methods, apparatuses and systems described in this document can be used either on their own or in combination with other methods, apparatuses and systems described in this document. In addition, any aspects of the methods, apparatuses and systems described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
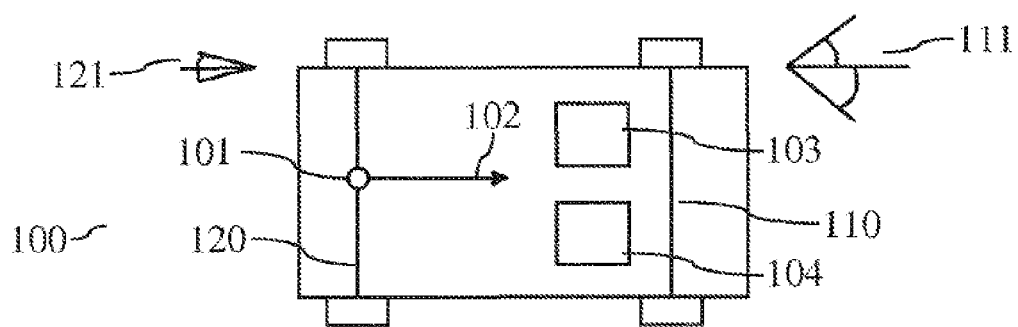
FIG. 1 shows an exemplary two track vehicle.

As set out at the outset, the present document is concerned with assisting a driver of a vehicle in a reversing maneuver. In this connection, FIG. 1 shows a block diagram of an exemplary multitrack, in particular two track, vehicle 100. The vehicle 100 comprises a front axle 110 and a rear axle 120. In this case, a steering apparatus of the front axle 110 can be used to implement a particular front steering angle range 111. If need be, the vehicle 100 can have a rear-wheel steering apparatus that can be used to implement a particular rear steering angle range 121. Typically, the front steering angle range 111 is substantially greater than the rear steering angle range 121.

The text below describes the measures described in this document on the basis of a reversing assistance system in which a reference travel for recording a reference trajectory is effected in the forward direction and in which a renewed travel along a travel trajectory is effected in the reverse direction along a reversing trajectory. The described first forward travel is therefore an example of a general reference travel and the described reversing trajectory is an example of a general travel trajectory. In addition, the second forward travel to the reversing position is an example of a correction travel to a correction position. In particular, the aspects described in this document:

in regard to a first forward travel apply generally to a reference travel (which if need be can in each case be traveled in the reverse direction with the vehicle 100);

in regard to a reverse travel apply generally to a renewed travel (which if need be can also be traveled in the forward direction with a vehicle 100);

in regard to a reversing trajectory apply generally to a travel trajectory (which if need be can also be traveled in the same direction as the reference trajectory during the reference travel);

in regard to a second forward travel apply generally to a correction travel that typically has an opposite direction of travel from the renewed travel;

in regard to a forward trajectory apply generally to a correction trajectory for the correction travel;

in regard to a forward gear or to a reverse gear apply generally to a gear that is required for the respective direction of travel; and/or in regard to a reversing position apply generally to a correction position (on the travel trajectory) that can be approached by means of a correction travel.

Figure 2:
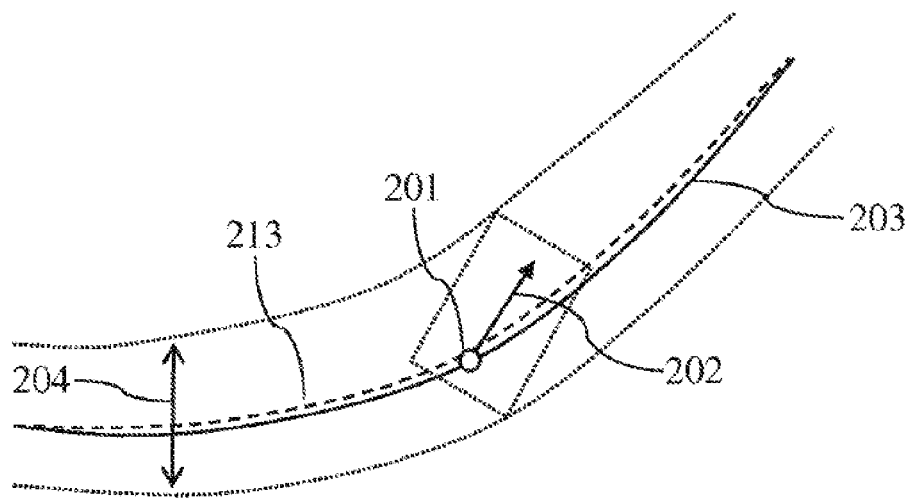
FIG. 2 shows an exemplary driving maneuver.

A user of the vehicle 100 can activate a reversing assistance system e.g. on entering a parking garage. In reaction thereto, a control unit 103 of the vehicle 100 detects a reference trajectory 203 during a forward travel (see FIG. 2) and stores it in a memory unit 104. The memory unit 104 can be realized e.g. as a ring memory that can be used to store reference data in regard to a reference trajectory 203 for the last x meters of a forward travel (where x=30, 40, 50 or more). If the forward travel is longer than the rated distance of x meters, then the reference data in regard to the section of the reference trajectory 203 that is furthest behind in each case can be overwritten with reference data in regard to the present section of the reference trajectory 203.

The reference data for a reference trajectory 203 can comprise position information 201 in regard to a reference point 101 on the vehicle 100, wherein the reference 101 can correspond e.g. to the middle of the rear axle 120. The reference data in regard to the position of the reference point 101 can be determined at a particular sampling rate (e.g. every 10 cm, 5 cm or less), so that the position information 201 for the position of the reference point 101 can be used to describe the course of the reference trajectory 203 during a forward travel of the vehicle 100 in a precise manner.

A vehicle 100 has a particular orientation 102 at a particular position on a forward travel. At one position, it is thus possible to determine orientation information 202 in regard to a rotation or alignment or orientation 102 of the vehicle 100 relative to the reference point 101. On the basis of the orientation information 202 at the multiplicity of positions on the reference trajectory 203, a coverage area 204, in particular an envelope, around the reference trajectory 203 can be determined (see FIG. 2) that indicates the area that a component (e.g. part of the bodywork) of the vehicle 100 was in during the forward travel. The coverage area 204 therefore indicates, on the assumption of static obstacles on the reference trajectory 203, the area in which the vehicle 100 can be driven along a reversing trajectory 213 without collision. In other words, the reversing trajectory 213 can be determined on the basis of the reference trajectory 203 such that the vehicle 100 remains within the coverage area 204 during the reverse travel along a reversing trajectory 213. As such, on the assumption of static obstacles, reversing without collision can be rendered possible.

The reference data for the reference trajectory 203 determined during the forward travel can therefore comprise, for each of a multiplicity of positions on the reference trajectory 203, position information 201 indicating the position of the reference point 101 on the vehicle 100 (e.g. in a Cartesian coordinate system relative to the initial position on the reference trajectory 203). In addition, the reference data can indicate, for each of the multiplicity of positions, orientation information 201 in regard to an orientation 102 of the vehicle 100 at the respective position. As such, the reference trajectory 203 and the coverage area 204 of the vehicle 100 on a forward travel can be described in a precise manner.

Alternatively or additionally, the reference data can comprise, for trajectory segments between a multiplicity of positions, curvature information in regard to a curvature of the respective trajectory segment. The reference trajectory 203 can then be described by a sequence of curvature values. In addition, interpolation of the sequence of curvature values allows a course of the reference trajectory 203 to be determined (e.g. by means of the use of clothoids). From the curvature values, it is also possible to determine the coverage area 204 of the vehicle during the forward travel on the reference trajectory 203.

The reference data can therefore describe a reference trajectory 203 and a coverage area 204 of a vehicle 100 during a forward travel in different ways. When an end position on the reference trajectory 203 is reached (e.g. when it is detected that the driver of the vehicle 100 selects a reverse gear), the reference data can be taken as a basis for determining a reversing trajectory 213 for assisted reversing of the vehicle 100 to the initial position on the reference trajectory 203. In this case, the reference trajectory 203 can be determined such that the vehicle 100:

reaches the initial position on the reference trajectory 203; and/or remains within the coverage area 204 as largely as possible.

The determined reversing trajectory 213 can indicate in particular a steering angle of the steering apparatus of the front axle 110 of the vehicle 100 as a function of the position on the reversing trajectory 213. The driver of the vehicle 100 can then take the determined reversing trajectory 213 as a basis for being assisted during the reverse travel. In particular, the steering apparatus of the vehicle 100 can be actuated automatically on the basis of the reversing trajectory 213, in order to undertake the transverse guidance of the vehicle 100. On the other hand, the longitudinal guidance of the vehicle 100, in particular the stipulation of the longitudinal speed and the direction of travel (forward gear or reverse gear) of the vehicle 100, can further be performed by the driver. The provision of such a reversing assistant allows a driver of a vehicle 100 to drive in reverse from a confined traffic situation (e.g. in a cramped parking garage) in a convenient manner.

An automatic steering apparatus of a vehicle 100 typically has a maximum possible steering speed. Consequently, the speed of travel at which a vehicle 100 can be driven along the reversing trajectory 213 is typically restricted to a particular maximum speed of travel, depending on the present curvature of the reversing trajectory 213. If the maximum speed of travel is exceeded, then the vehicle 100 strays from the reversing trajectory 213. Consequently, it can be necessary for the reversing assistance system to be shut down. This reduces the availability of the reversing assistance system.

Figure 3:
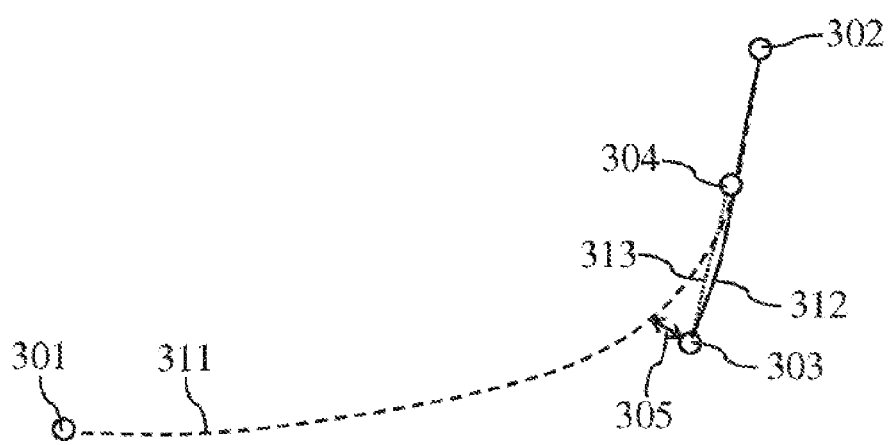
FIG. 3 shows an exemplary forward move within the scope of an assisted reversing maneuver.

FIG. 3 illustrates a travel scenario in which a vehicle 100 needs to be driven along the reversing trajectory 311 from an end position 302 to an initial position 301 (wherein the respective positions 301, 302 refer to the reference point 101 on the vehicle 100 in this document). Owing to an excessive speed of travel, however, the vehicle 100 can stray from the reversing trajectory 311 and be driven along the trajectory 312. For the intermediate position 303, it is possible to detect that the distance 305 of the intermediate position 303 from the originally envisaged reversing trajectory 311 has reached or exceeded a particular distance threshold value. As a reaction thereto, a user interface of the vehicle 100 can be used to output (visual and/or audible) advice to the driver of the vehicle 100. In particular, advice can be output indicating that the vehicle 100 is straying or has already strayed from the planned reversing trajectory 311. In addition, the driver of the vehicle 100 can be asked to stop the vehicle 100, to select a forward gear and if need be to drive along a forward trajectory 313 to a reversing position 304 in order to convey the vehicle 100 back to the planned reversing trajectory 311. It is therefore possible to propose the performance of a correction move in the forward direction in order to bring the vehicle 100 back to the reversing trajectory 311 in the forward direction.

The forward trajectory 313 can be determined by the control unit 103 of the vehicle 100 on the basis of the position information in regard to the intermediate position 303 and on the basis of the stored data in regard to the reversing trajectory 311. In addition, the control unit 103 can be configured to actuate the steering apparatus of the vehicle 100 on the basis of the determined forward trajectory 313 in order to assist the driver of the vehicle 100 in the correction move.

On arrival at the reversing position 304, the driver of the vehicle 100 can be asked to select a reverse gear in order to resume the assisted reverse travel along the reversing trajectory 311 starting from the reversing position 304.

The control unit 103 can therefore detect that the vehicle 100 will leave or has already left the target trajectory 311. In reaction thereto, a forward move (in particular a forward trajectory 313) can be planned in order to be able to drive back onto the target trajectory 311 following the forward move. The driver can be asked via a user interface of the vehicle 100 (e.g. via a head unit) to stop the vehicle 100 and change gear. Following the gear change, an automated forward move can be made if need be. Subsequently, the vehicle 100 can be stopped again and an automated reverse travel on the original trajectory 311 can be effected.

Figure 4:
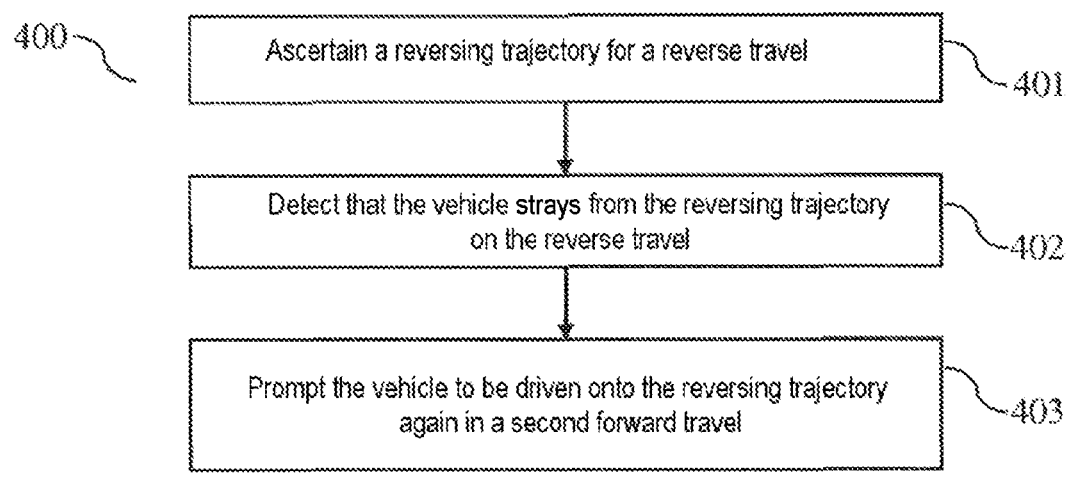
FIG. 4 is a flowchart for an exemplary method for providing a correction move for a reversing maneuver.

FIG. 4 shows a flowchart for an exemplary method 400 for driving a vehicle 100 within the scope of a reversing assistance system. The method 400 comprises determining 401, on the basis of reference data in regard to a first forward travel of the vehicle 100, a reversing trajectory 311 for a reverse travel from an end position 302 to an initial position 301. The reference data may have been captured and stored within the scope of the first forward travel. In this case, the reference data can indicate in particular the course of the reference trajectory 203 along which the vehicle 100 has been driven during the first forward travel. Typically, the vehicle 100 has been longitudinally and transversely guided by a driver of the vehicle 100 within the scope of the first forward travel. In particular, the steering apparatus of the vehicle 100 may have been operated manually by the driver of the vehicle 100 during the first forward travel. The reversing trajectory 311 can correspond (substantially) to the reference trajectory 203, which means that the vehicle 100 can be returned to the initial position 301 again on the same path.

The method 400 further comprises detecting or determining 402 that the vehicle 100 leaves the reversing trajectory 311 on the reverse travel. During the reverse travel, the steering apparatus of the vehicle 100 can be automatically controlled by a control unit 103 of the vehicle 100 on the basis of the reversing trajectory 311. On the other hand, the speed of travel can be selected by the driver of the vehicle 100. Owing to an excessive speed of travel, the vehicle 100 may no longer be able to follow the reversing trajectory 311 (in particular in the case of a tight curve). Consequently, it might be necessary to terminate the reversing assistance system.

However, the method 400 comprises, in reaction to the detecting 402, prompting 403 of the vehicle 100 to be driven, in a second forward travel, to a reversing position 304 that allows the vehicle 100 to be driven along at least one (remaining) section of the reversing trajectory 311 again to the initial position 301. The reversing position 304 can in this case be on the reversing trajectory 311, so that the vehicle 100 can again be (transversely) guided by the reversing assistance system along a reversing trajectory 311 from the reversing position 304 to the initial position 301.

The measures described in this document allow unnecessary deactivations of a reversing assistance system to be avoided. As such, the availability of a reversing assistance system can be increased.

The present invention is not restricted to the exemplary embodiments shown. In particular, it should be borne in mind that the description and the figures are intended to illustrate the principle of the proposed methods, apparatuses and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for a reversing assistance system of a vehicle, comprising:
   a control unit operatively configured to:
   take reference data in regard to a first forward travel of the vehicle as a basis for determining a reversing trajectory for a reverse travel from an end position to an initial position;
   control a steering apparatus of the vehicle during the reverse travel of the vehicle on the basis of the reversing trajectory;
   detect that the vehicle leaves the reversing trajectory on the reverse travel; and
   react thereto by prompting the vehicle to be driven, in a second forward travel, to a reversing position that allows the vehicle to be driven along at least one section of the reversing trajectory again to the initial position.

2. The control unit as claimed in claim 1, wherein the control unit is further operatively configured to:
   determine a distance of a present or predicted position of the vehicle from the reversing trajectory; and
   take the distance as a basis for detecting that the vehicle leaves the reversing trajectory on the reverse travel.

3. The control unit as claimed in claim 1, wherein during the reverse travel, longitudinal guidance of the vehicle is effected at least at times by a driver of the vehicle.

4. The control unit as claimed in claim 1, wherein the control unit is further operatively configured to determine a forward trajectory that can be used to drive the vehicle to the reversing position in the second forward travel.

5. The control unit as claimed in claim 4, wherein the control unit is further operatively configured to control a steering apparatus of the vehicle during the second forward travel of the vehicle on the basis of the forward trajectory.

6. The control unit as claimed in claim 1, wherein
   the control unit is further operatively configured to output advice to a driver of the vehicle if it has been detected that the vehicle leaves the reversing trajectory on the reverse travel, wherein
   the advice indicates that the driver needs to bring the vehicle to a standstill and that the driver needs to select a forward gear for the second forward travel.

7. The control unit as claimed in claim 1, wherein the control unit is further operatively configured to:
   detect that the vehicle reaches the reversing position; and
   react thereto by prompting a driver of the vehicle to bring the vehicle to a standstill and to select a reverse gear in order to continue the reverse travel.

8. The control unit as claimed in claim 1, wherein
   the reference data indicate a reference trajectory of the vehicle for the first forward travel from the initial position to the end position.

9. The control unit as claimed in claim 1, wherein
   the reference data comprise:
   position information in regard to a multiplicity of positions on a reference trajectory of the first forward travel; and
   orientation information in regard to an orientation of the vehicle at the multiplicity of positions.

10. A method for driving a vehicle within the scope of a reversing assistance system having automated transverse guidance, the method comprising the steps of:
   determining, on the basis of reference data in regard to a first forward travel of the vehicle, a reversing trajectory for a reverse travel from an end position to an initial position;
   detecting that the vehicle leaves the reversing trajectory on the reverse travel; and
   reacting thereto by prompting the vehicle to be driven, in a second forward travel, to a reversing position that allows the vehicle to be driven along at least one section of the reversing trajectory again to the initial position.

11. A control unit for a driver assistance system of a vehicle having automated transverse guidance and/or automated longitudinal guidance, comprising:
   a control unit operatively configured to:
   take reference data in regard to a first reference travel of the vehicle as a basis for determining a travel trajectory for a renewed travel;
   detect that the vehicle leaves the travel trajectory on the renewed travel; and
   react thereto by prompting the vehicle to be driven, in a correction travel, to a correction position that allows the vehicle to be driven along at least one section of the travel trajectory again.

12. A method for driving a vehicle within the scope of a driver assistance system having automated transverse guidance and/or automated longitudinal guidance, the method comprising the steps of:

determining, on the basis of reference data in regard to a reference travel of the vehicle, a travel trajectory for a renewed travel;

detecting that the vehicle leaves the travel trajectory on the renewed travel; and reacting thereto by prompting the vehicle to be driven, in a correction travel, to a correction position that allows the vehicle to be driven along at least one section of the travel trajectory again.

* * * * *